United States Patent
Kim et al.

(10) Patent No.: US 11,479,076 B2
(45) Date of Patent: Oct. 25, 2022

(54) HEAT PUMP SYSTEM FOR VEHICLE

(71) Applicants: HYUNDAI MOTOR COMPANY, Seoul (KR); KIA CORPORATION, Seoul (KR)

(72) Inventors: Jeawan Kim, Gwangmyeong-si (KR); Jae Yeon Kim, Hwaseong-si (KR); Yeonho Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 50 days.

(21) Appl. No.: 17/317,419

(22) Filed: May 11, 2021

(65) Prior Publication Data
US 2022/0088990 A1    Mar. 24, 2022

(30) Foreign Application Priority Data

Sep. 24, 2020    (KR) .................. 10-2020-0123942

(51) Int. Cl.
*B60H 1/32*    (2006.01)
*B60H 1/00*    (2006.01)
*B60H 1/03*    (2006.01)

(52) U.S. Cl.
CPC ......... *B60H 1/00278* (2013.01); *B60H 1/004* (2013.01); *B60H 1/00485* (2013.01); *B60H 1/03* (2013.01); *B60H 1/3207* (2013.01); *B60H 1/3227* (2013.01); *B60H 1/3213* (2013.01); *B60H 2001/00307* (2013.01); *B60H 2001/3285* (2013.01)

(58) Field of Classification Search
CPC ............... B60H 1/00278; B60H 1/004; B60H 1/00485; B60H 1/03; B60H 1/3207; B60H 1/3227; B60H 1/3213; B60H 2001/00307; B60H 2001/3285
USPC ......................................................... 62/244
See application file for complete search history.

(56) References Cited

U.S. PATENT DOCUMENTS

| 9,441,865 | B2 | 9/2016 | Atsushi et al. |
| 10,661,631 | B2 | 5/2020 | Kawano |
| 11,318,816 | B2 * | 5/2022 | Kim ................... B60H 1/32281 |
| 2018/0264913 | A1 * | 9/2018 | Enomoto ........... B60H 1/32284 |

FOREIGN PATENT DOCUMENTS

| KR | 10-1558314 B1 | 10/2015 |
| KR | 2020-0040432 A | 4/2020 |

* cited by examiner

*Primary Examiner* — Davis D Hwu
(74) *Attorney, Agent, or Firm* — McDonnell Boehnen Hulbert & Berghoff LLP

(57) ABSTRACT

A heat pump system of a vehicle controls a temperature of a battery module by using one chiller in which a refrigerant and a coolant are heat-exchanged, and recovers waste heat generated from an electrical component and a battery module to use it for indoor heating, thereby improving heating performance and efficiency, and the heat pump increases a flow rate of a refrigerant by applying a gas injection part that selectively operates in a heating mode of the vehicle, thereby maximizing heating performance.

20 Claims, 7 Drawing Sheets

HEAT PUMP SYSTEM FOR VEHICLE

CROSS REFERENCE TO RELATED APPLICATIONS

This application claims priority to and the benefit of Korean Patent Application No. 10-2020-0123942 filed in the Korean Intellectual Property Office on Sep. 24, 2020, the entire contents of which are incorporated herein by reference.

BACKGROUND

(a) Field

The present disclosure relates to a heat pump system for a vehicle. More particularly, the present disclosure relates to a heat pump system for a vehicle that may use one chiller in which a refrigerant and a coolant are heat-exchanged to control a temperature of a battery module and a temperature of an autonomous driving controller, and may use waste heat generated from an electrical component, a battery module, and an autonomous driving controller to improve heating performance and efficiency.

(b) Description of the Related Art

Generally, an air conditioner system for a vehicle includes an air conditioner for circulating a refrigerant to heat or cool an interior of the vehicle.

The air conditioner system, which may maintain a fresh indoor condition by maintaining an indoor temperature of a vehicle at an appropriate temperature regardless of an outdoor temperature change, is configured to heat or cool an interior of the vehicle by heat-exchange by a condenser and an evaporator during a process in which a refrigerant discharged by driving a compressor is circulated to the compressor again by passing through the condenser, a receiver drier, an expansion valve, and the evaporator.

That is, in the air conditioner system, a high-temperature and high-pressure gaseous refrigerant compressed by the compressor is condensed through the condenser, then is evaporated by the evaporator through the receiver drier and the expansion valve to lower the indoor temperature and humidity in a summer cooling mode.

Recently, as concern about energy efficiency and environmental pollution has gradually increased, development of an environmentally-friendly vehicle capable of being substantially substituted for a vehicle having an internal combustion engine has been required, and the environmentally-friendly vehicles are typically classified into an electric vehicle which is typically driven using a fuel cell or electricity as a power source, and a hybrid vehicle which is driven using an engine and an electric battery.

In the electric vehicle and the hybrid vehicle of the environmentally-friendly vehicles, a separate heater is not used, unlike an air conditioner of a general vehicle, and an air conditioner, which is applied to the environmentally-friendly vehicle, is typically referred to as a heat pump system.

In a case of the electric vehicle using the fuel cell, chemical reaction energy of oxygen and hydrogen is converted into electrical energy to generate driving force, and during this process, heat energy is generated by chemical reaction in the fuel cell, and as a result, effective removal of the generated heat is required to secure the performance of the fuel cell.

Even in the hybrid vehicle, the driving force is generated by driving the motor by using electricity supplied from the fuel cell or the electric battery together with the engine that is actuated with a general fuel, and as a result, the performance of the motor can be secured only by effectively removing the heat generated from the fuel cell or the battery, and the motor.

Accordingly, in a hybrid vehicle or electric vehicle of a prior art, a battery cooling system, a cooling part, and a heat pump system should be configured to have respective separate circuits to prevent heat generation of a motor, electrical components, and a battery including a fuel cell.

Thus, a size and a weight of a cooling module disposed in the front of the vehicle are increased, and a layout of connecting pipes for supplying a refrigerant or coolant to the heat pump system, the cooling part, and the battery cooling system inside an engine compartment becomes complicated.

In addition, since the battery cooling system for heating or cooling the battery is separately provided according to a state of the vehicle so that the battery may operate in an optimal state, a plurality of valves for connecting the respective connecting pipes are applied, thus noise and vibration are transmitted to the interior of the vehicle, resulting in poor ride comfort.

In addition, when heating the interior of the vehicle, the heating performance decreases due to a lack of a heat source, the amount of electricity consumption increases due to the use of an electric heater, and the power consumption of the compressor increases.

The above information disclosed in this Background section is only for enhancement of understanding of the background of the disclosure, and therefore it may contain information that does not form the prior art that is already known in this country to a person of ordinary skill in the art.

SUMMARY

Therefore, the present disclosure has been made in an effort to provide a heat pump system for a vehicle that may use one chiller in which a refrigerant and a coolant are heat-exchanged to control a temperature of a battery module and a temperature of an autonomous driving controller, and may improve heating performance and efficiency by recovering waste heat generated from an electrical component, a battery module, and an autonomous driving controller and using it for interior heating.

In addition, the present disclosure has been made in an effort to provide a heat pump system for a vehicle that may maximize heating performance by applying a gas injection part that selectively operates in a heating mode of a vehicle to increase a flow rate of a refrigerant.

An embodiment of the present disclosure provides a heat pump system for a vehicle, including a first cooling apparatus including a first radiator, a first water pump, and a first valve that are connected by a first coolant line, and circulating a first coolant in the first coolant line to cool at least one electrical component provided in the first coolant line, a second cooling apparatus including a second radiator, a second water pump, a battery module, an autonomous driving controller, and a second valve that are connected by a second coolant line, and circulating a second coolant to the battery module and the autonomous driving controller, a chiller through which a first branch line connected to the first coolant line through the first valve and a second branch line connected to the second coolant line through the second valve respectively pass, that is connected to a refrigerant line of an air conditioner through a refrigerant connection line thereof, and that controls a temperature of the second coolant by heat-exchanging the second coolant selectively inflowing through the first branch line or the second branch line with a refrigerant selectively supplied from the air conditioner, and a gas injection part provided in the air conditioner and increasing a flow rate of the refrigerant circulating in the refrigerant line by bypassing some of a refrigerant passing through an internal condenser to a compressor.

One end of the first branch line may be connected to the first coolant line through the first valve, and the other end of the first branch line is connected to the first coolant line connected to the electrical component, and one end of the second branch line may be connected to the second coolant line through the second valve provided in the second coolant line between the second radiator and the second water pump, and the other end of the second branch line is connected to the second coolant line between the autonomous driving controller and the second radiator.

The air conditioner may include an HVAC module including an evaporator connected thereto through the refrigerant line, and an opening/closing door that controls to selectively flow external air passing through the evaporator into the internal condenser according to cooling, heating, and dehumidifying modes of the vehicle, a heat-exchanger heat-exchanging a refrigerant supplied through the refrigerant line with external air; a compressor connected thereto between the evaporator and the internal condenser through the refrigerant line, a first expansion valve provided in the refrigerant line between the heat-exchanger and the evaporator, a second expansion valve provided in the refrigerant connection line, and an accumulator provided in the refrigerant line between the evaporator and the compressor and connected to the refrigerant connection line.

The second expansion valve, when cooling the battery module by using a coolant heat-exchanged with the refrigerant, may expand the refrigerant flowing through the refrigerant connection line to flow it into the chiller.

The gas injection part may include a gas-liquid separator provided in the refrigerant line between the internal condenser and the heat-exchanger, and separating and selectively discharging a gaseous refrigerant and a liquid refrigerant among the refrigerant that have passed through the internal condenser, a bypass line connecting the gas-liquid separator and the compressor, and selectively supplying the gaseous refrigerant from the gas-liquid separator to the compressor, a bypass valve provided in the bypass line, a third expansion valve provided in the refrigerant line between the internal condenser and the gas-liquid separator, and a fourth expansion valve provided in the refrigerant line between the gas-liquid separator and the heat-exchanger.

When the gas injection part is operated in a heating mode of the vehicle, the third expansion valve may expand a refrigerant supplied from the internal condenser to supply it to the gas-liquid separator, and the fourth expansion valve may expand a refrigerant supplied from the gas-liquid separator to flow to the refrigerant line.

When the gas injection part is not operated in a heating mode of vehicle, the third expansion valve may pass a refrigerant supplied from the internal condenser, and the fourth expansion valve may expand a refrigerant that has passed through the gas-liquid separator to supply it to the heat-exchanger.

In a cooling or dehumidifying mode of the vehicle, the third and fourth expansion valves may not expand a refrigerant supplied from the internal condenser but may flow it through the refrigerant line.

The bypass valve, when the gas injection part is operated, may operate so that the bypass line is opened.

The first, second, third, and fourth expansion valves may be electronic expansion valves that selectively expand the refrigerant while controlling flowing of the refrigerant.

The heat-exchanger may additionally condense or evaporate a refrigerant condensed in the internal condenser through heat-exchange with external air, according to a selective operation of the fourth expansion valve.

The air conditioner may further include a refrigerant branch line connecting the refrigerant line between the heat-exchanger and the first expansion valve through a refrigerant valve provided in the refrigerant line between the heat-exchanger and the gas injection part.

The refrigerant valve, when external heat is not recovered in a dehumidifying or heating mode of the vehicle, may open the refrigerant branch line, and may close a part of the refrigerant line connected to the heat-exchanger.

The first and second valves and the refrigerant valve may be 3-way valves.

When the gas injection part operates while recovering waste heat from the electrical component in a heating mode of the vehicle, in a state in which the first coolant line connected to the electrical component is opened through an operation of the first valve, and the first coolant line connected to the first radiator is closed, the first branch line may be opened, in the first cooling apparatus, the first coolant that has passed through the electrical component through an operation of the first water pump may be supplied to the chiller through the opened first branch line without passing through the first radiator, the second cooling apparatus may stop operation, in the air conditioner, the refrigerant line connected to the evaporator may be closed by the first expansion valve, the refrigerant connection line may be opened by the second expansion valve, the second expansion valve may expand the refrigerant supplied to the refrigerant connection line to supply it to the chiller, in the gas injection part, the bypass line may be opened by the bypass valve, the third expansion valve may expand the refrigerant to supply it to the gas-liquid separator, and the fourth expansion valve may expand a refrigerant passing through the gas-liquid separator, and the refrigerant valve may open the refrigerant branch line so that a refrigerant expanded while passing through the fourth expansion valve is not supplied to the heat-exchanger.

In a dehumidifying mode of the vehicle, the first and second cooling apparatuses may stop operation, in the air conditioner, the refrigerant line connected to the evaporator may be opened by the first expansion valve, the refrigerant connection line may be closed by the second expansion valve, and the refrigerant valve may open the refrigerant branch line so that the refrigerant supplied from the internal condenser is not supplied to the heat-exchanger.

When cooling the battery module and the autonomous driving controller in a cooling mode of the vehicle, the second branch line may be opened by of the second valve, and the second coolant line connected to the second radiator may be closed based on the second branch line, in the second cooling apparatus, while the second coolant is circulated in the opened second branch line and the opened second coolant line by the second water pump, a coolant that has passed through the chiller may be supplied to the battery module and the autonomous driving controller, in the air conditioner, the refrigerant may be circulated along the refrigerant line and the refrigerant connection line in a state in which the refrigerant connection line is opened by the second expansion valve, and the first and second expansion valves may expand the refrigerant so that an expanded refrigerant is supplied to the evaporator and the chiller, respectively.

When recovering waste heat from an external heat source, the electrical component, the battery module, and the autonomous driving controller in a heating mode of the vehicle, in a state in which the first coolant line connected to the electrical component is opened by the first valve and the first coolant line connected to the first radiator is closed, the first branch line may be opened, in the first cooling apparatus, the first coolant that has passed through the electrical component through an operation of the first water pump may be supplied to the chiller through the opened first branch line without passing through the first radiator, in a state in which the second branch line is opened by the second valve, the second coolant line connected to the second radiator may be closed based on the second branch line, in the second cooling apparatus, the second coolant that has passed the battery module and the autonomous driving controller by the second water pump may be supplied to the chiller through the second branch line, in the air conditioner, a refrigerant line connecting the heat-exchanger and the evaporator may be closed by the first expansion valve, the refrigerant connection line may be opened by the second expansion valve, and the second expansion valve may expand a refrigerant supplied to the refrigerant connection line to supply it to the chiller.

The heat-exchanger may be an air-cooled heat-exchanger.

When cooling the electrical component, the battery module, and the autonomous driving controller, the first branch line may be closed by the first valve, the second branch line may be closed by the second valve, the first coolant cooled by the first radiator may be supplied to the electrical component along the first coolant line through an operation of the first water pump, and the second coolant cooled by the second radiator may be supplied to the battery module and the autonomous driving controller along the second coolant line through an operation of the second water pump.

The electrical component may include a power control device, an inverter, an on board charger (OBC), or a power converter.

As described above, according to the heat pump system for the vehicle according to the embodiment of the present disclosure, simplification of the system may be realized, by using one chiller in which a refrigerant and a coolant are heat-exchanged to control a temperature of a battery module and a temperature of an autonomous driving controller.

In addition, according to the embodiment of the present disclosure, by efficiently controlling a temperature of a battery module, it is possible to operate the battery module at optimal performance, and a total mileage of the vehicle may be increased through efficient management of the battery module.

In addition, according to the embodiment of the present disclosure, it is possible to improve heating efficiency by selectively using an external heat source, or waste heat of an electrical component, a battery module, or an autonomous driving controller in a heating mode of a vehicle.

In addition, according to the embodiment of the present disclosure, it is possible to maximize heating performance by selectively increasing a flow rate of refrigerant in a heating mode of a vehicle by applying a gas injection part.

Furthermore, according to the embodiment of the present disclosure, it is possible to reduce manufacturing cost and weight through simplification of an entire system, and to improve space utilization.

DETAILED DESCRIPTION

Figure 1:
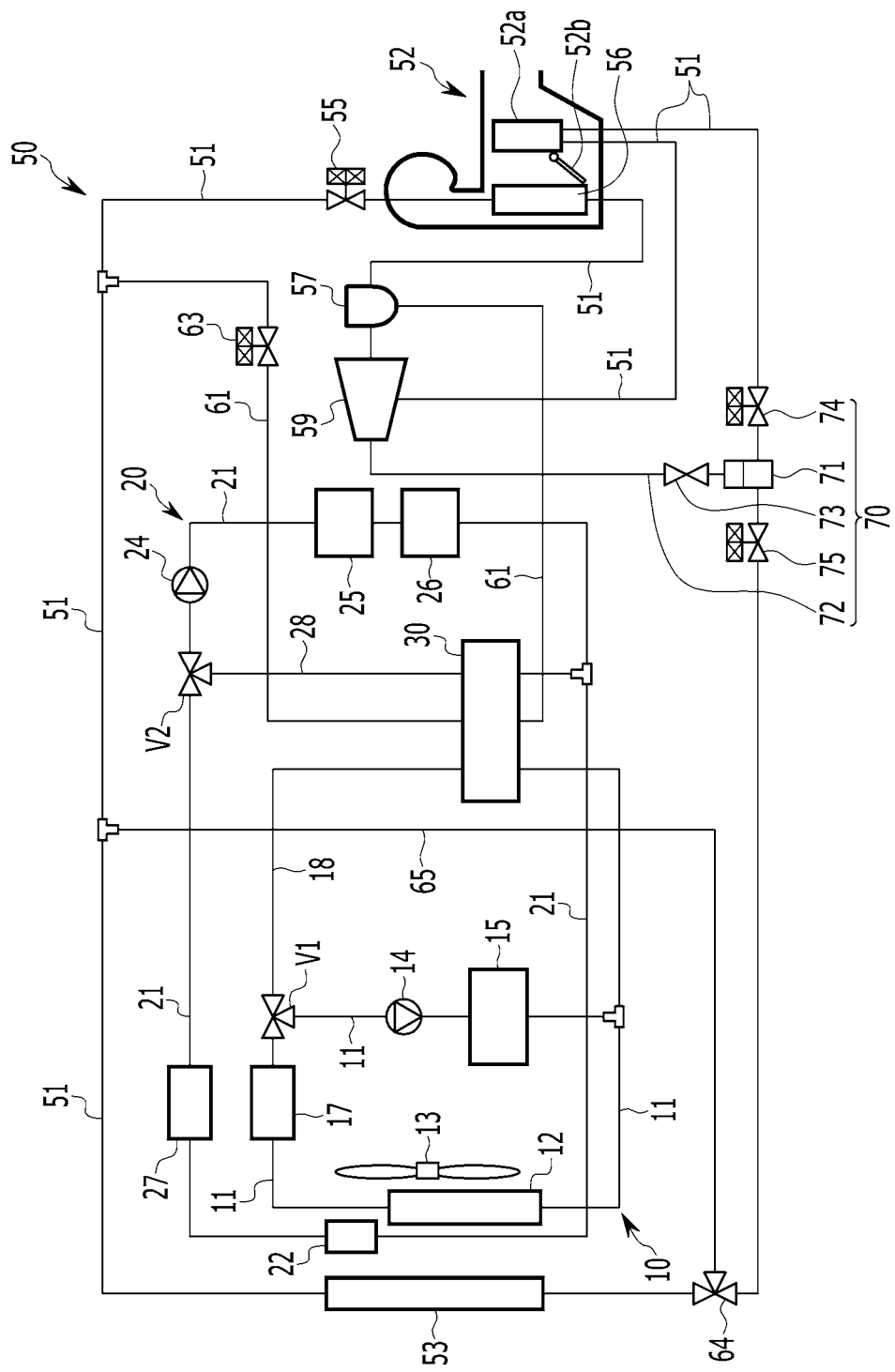
FIG. 1 illustrates a block diagram of a heat pump system for a vehicle according to an embodiment of the present disclosure.

An embodiment of the present disclosure will hereinafter be described in detail with reference to the accompanying drawings.

Since the embodiments described in the specification and the configurations shown in the drawings are merely the most preferable embodiments and configurations of the present disclosure, they do not represent all of the technical ideas of the present disclosure, and it should be understood that that various equivalents and modified examples, which may replace the embodiments, are possible when filing the present application.

In order to clearly describe the present disclosure, parts that are irrelevant to the description are omitted, and identical or similar constituent elements throughout the specification are denoted by the same reference numerals.

Since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

FIG. 1 illustrates a block diagram of a heat pump system for a vehicle according to an embodiment of the present disclosure.

A heat pump system for a vehicle according to an embodiment of the present disclosure may adjust a temperature of a battery module 25 by using one chiller 30 in which a refrigerant and a coolant are heat-exchanged, and it may use an external heat source, or waste heat of an electrical component 15, a battery module 25, or an autonomous driving controller 26, and a gas injection part 70, thereby improving heating performance and efficiency.

Here, in the heat pump system of an electric vehicle, a first cooling apparatus 10 for cooling the electrical component 15, a second cooling apparatus 20 for cooling the battery module 25 and an autonomous driving controller 26, and an air conditioner 50 that is an air conditioning apparatus for cooling and heating an interior may be mutually interconnected.

That is, referring to FIG. 1, the heat pump system may include the first cooling apparatus 10, the second cooling apparatus 20, a chiller 30, and the air conditioner 50.

First, the first cooling apparatus 10 includes a first radiator 12, a first water pump 14, a first valve V1, and a first reservoir tank 17 connected by a first coolant line 11.

The first radiator 12 is disposed at the front of the vehicle, a cooling fan 13 is provided at the rear thereof, and the coolant is cooled through an operation of the cooling fan 13 and heat-exchange with the outside air.

In addition, the electrical component 15 may include a power conversion device such as an electric power control unit (EPCU), a motor, an inverter, or an on board charger (OBC).

The electric power control unit, the inverter, or the motor heats up while driving, and the charger may heat up when charging the battery module 25.

The electrical component 15 configured as described above may be provided in the first coolant line 11 to be cooled in a water-cooled manner.

That is, when the waste heat of the electrical component 15 is recovered in the heating mode of the vehicle, the heat generated from the power conversion device such as the EPCU, the motor, the inverter, or the OBC may be recovered.

Meanwhile, the first reservoir tank 17 is provided in the first coolant line 11 between the first radiator 12 and the first valve V1. The coolant cooled by the first radiator 12 may be stored in the first reservoir tank 17.

The first cooling apparatus 10 configured as described above may circulate the coolant in the first coolant line 11 so that the coolant may be supplied to the electrical component 15 provided in the first coolant line 11.

That is, the first cooling apparatus 10 circulates the coolant cooled by the first radiator 12 along the first coolant line 11 through the operation of the first water pump 14, thereby cooling the electrical component 15 so as to not overheat.

In the present embodiment, the second cooling apparatus 20 may include a second radiator 22, a second water pump 24, the battery module 25, the autonomous driving controller 26, and a second valve V2 connected by a second coolant line 21.

The second cooling apparatus 20 may selectively supply the coolant cooled by the second radiator 22 to the battery module 25 and the autonomous driving controller 26.

Here, the second radiator 22 is disposed on the same line as the first radiator 12, and the coolant is cooled through the operation of the cooling fan 13 and heat-exchange with the outside air.

Meanwhile, it is described in the present embodiment that the second radiator 22 is disposed on the same line as the first radiator 12, but the present disclosure is not limited thereto, and the first and second radiators 12 and 22 may be integrally configured.

In addition, a second reservoir tank 27 is provided in the second coolant line 21 between the second radiator 22 and the second water pump 24. The coolant cooled by the second radiator 22 may be stored in the second reservoir tank 27.

The second cooling apparatus 20 configured as described above may selectively circulate the coolant in the battery module 25 and the autonomous driving controller 26 by an operation of the second water pump 24.

Here, the battery module 25 and the autonomous driving controller 26 supply power to the electrical component 15, and are formed to be cooled by a coolant flowing along the second coolant line 21.

Here, the first and second water pumps 14 and 24 may be electric water pumps.

In the present embodiment, the chiller 30 is provided with a first branch line 18 connected to the first coolant line 11 through the first valve V1 and a second branch line 28 connected to the second coolant line 21 through the second valve V2, and a coolant may be selectively circulated in the first and second branch lines.

The chiller 30 is connected to a refrigerant line 51 of the air conditioner 50 through a refrigerant connection line 61. That is, the chiller 30 may be a water-cooled heat-exchanger into which a coolant flows.

Accordingly, the chiller 30 heat-exchanges the coolant selectively inflowing through the first branch line 18 or the second branch line 28 with the refrigerant selectively supplied from the air conditioner 50 to control the temperature of the coolant.

Here, one end of the first branch line 18 is connected to the first coolant line 11 through the first valve V1. In addition, the other end of the first branch line 18 may be connected to the first coolant line 11 connected to the electrical component 15 or the first radiator 12.

While the waste heat from the electrical component 15 is recovered, the first branch line 18 may be selectively opened through the operation of the first valve V1 so that the coolant that passes through the electrical component 15 may be supplied back to the electrical component 15 without passing through the first radiator 12.

In addition, one end of the second branch line 28 is connected to the second coolant line 21 through the second valve V2 provided in the second coolant line 21 between the second radiator 22 and the second water pump 24.

The other end of the second branch line 28 may be connected to the second coolant line 21 between the autonomous driving controller 26 and the second radiator 22.

When the waste heat of the battery module 25 and the autonomous driving controller 26 is recovered, or the temperature of the battery module 25 and the autonomous driving controller 26 is increased, the second branch line 28 may be selectively opened and closed through the operation of the second valve V2 so that the coolant that has passed through the battery module 25 and the autonomous driving controller 26 may be supplied back to the battery module 25 and the autonomous driving controller 26 without passing through the second radiator 22.

Here, the first valve V1 and the second valve V2 control the flow of the coolant in the first and second cooling apparatuses 10 and 20 through the opening and closing control of the first and second branch lines 18 and 28.

That is, when cooling the electrical component 15 by using the coolant cooled by the first radiator 12, the first valve V1 may open the first coolant line 11 connected to the first radiator 12 and close the first branch line 18.

Then, while the coolant cooled by the first radiator 12 is circulated along the first coolant line 11 connected thereto through the operation of the first valve V1, it may cool the electrical component 15.

Conversely, when recovering the waste heat from the electrical component 15, the first valve V1 may close the first coolant line 11 connected to the first radiator 12 and open the first branch line 18.

Then, the coolant circulated in the first cooling apparatus 10 passes through the electrical component 15 along the opened first coolant line 11 and the first branch line 18 without passing through the first radiator 12, thus the temperature thereof may rise.

In addition, when the battery module 25 and the autonomous driving controller 26 are cooled by using the coolant cooled by the second radiator 22, the second valve V2 may close the second branch line 28.

Then, while the coolant cooled by the second radiator 22 flows along the second coolant line 21 connected thereto through the operation of the second valve V2, it may cool the battery module 25 and the autonomous driving controller 26.

Meanwhile, when cooling the battery module 25 and the autonomous driving controller 26 by using the coolant heat-exchanged with the refrigerant in the chiller 30, and when recovering waste heat from the battery module 25 and the autonomous driving controller 26, the second valve V2 may open the second branch line 28 and close the second coolant line 21 connected to the second radiator 22.

Accordingly, a low-temperature coolant in which the heat-exchange with the refrigerant in the chiller 30 is completed flows into the battery module 25 and the autonomous driving controller 26 through the second branch line 28 opened by the second valve V2, so that the battery module 25 and the autonomous driving controller 26 may be efficiently cooled.

On the other hand, in a case in which waste heat is recovered from the battery module 25 and the autonomous driving controller 26, by preventing the coolant circulating along the second coolant line 21 through the operation of the second valve V2 from flowing into the second radiator 22, the waste heat may be recovered from the battery module 25 and the autonomous driving controller 26.

In the present embodiment, the air conditioner 50 includes an HVAC (heating, ventilation, and air conditioning) module 52 connected thereto through the refrigerant line 51, a heat-exchanger 53, a first expansion valve 55, an evaporator 56, and an accumulator 57, a compressor 59, and a second expansion valve 63.

First, the HVAC module 52 includes the evaporator 56 connected thereto through the refrigerant line 51, and an opening/closing door 52b for controlling the external air passing through the evaporator 56 to selectively flow into an internal condenser 52a according to the cooling, heating, and heating/dehumidifying modes of the vehicle.

That is, the opening/closing door 52b is opened so that the external air that has passed through the evaporator 56 flows into the internal condenser 52a in the heating mode of the vehicle. In contrast, in the cooling mode of the vehicle, the opening/closing door 52b closes the internal condenser 52a side so that the external air cooled while passing through the evaporator 56 directly flows into the vehicle.

In the present embodiment, the heat-exchanger 53 is connected to the refrigerant line 51 so that the refrigerant passes therethrough. The heat-exchanger 53 may heat-exchange the refrigerant supplied through the refrigerant line 51 with external air.

That is, the heat-exchanger 53 is disposed in front of the first and second radiators 12 and 22 to heat-exchange the refrigerant that has been flowed thereinto with the external air. The heat-exchanger 53 may be an air-cooled heat-exchanger that condenses or evaporates a refrigerant by using external air.

The first expansion valve 55 is provided in the refrigerant line 51 between the heat-exchanger 53 and the evaporator 56. The first expansion valve 55 receives the refrigerant passed through the heat-exchanger 53 to expand it.

The accumulator 57 is provided in the refrigerant line 51 between the evaporator 56 and the compressor 59, and is connected to the refrigerant connection line 61.

The accumulator 57 improves efficiency and durability of the compressor 59 by supplying only the gaseous refrigerant to the compressor 59.

In the present embodiment, one end of the refrigerant connection line 61 is connected to the refrigerant line 51 between the heat-exchanger 53 and the first expansion valve 55. In addition, the other end of the refrigerant connection line 61 may be connected to the accumulator 57.

Here, the accumulator 57 may supply the gaseous refrigerant of the refrigerant supplied through the refrigerant connection line 61 to the compressor 59.

Meanwhile, the second expansion valve 63 may be provided in the refrigerant connection line 61.

When cooling the battery module 25 and the autonomous driving controller 26 by using the coolant heat-exchanged with the refrigerant, the second expansion valve 63 may expand the refrigerant inflowing through the refrigerant connection line 61 to flow it into the chiller 30.

Here, the second expansion valve 63 may operate even when the waste heat of the electrical component 15, or the waste heat of the battery module 25 and the autonomous driving controller 26, is recovered in the heating mode of the vehicle.

The second expansion valve 63 may selectively expand the refrigerant inflowing through the refrigerant connection line 61 to flow into the chiller 30.

That is, the second expansion valve 63 expands the refrigerant discharged from the heat-exchanger 53 to flow it into the chiller 30 in a state of lowering the temperature thereof, so that the temperature of the coolant passing through the inside of the chiller 30 may be further reduced.

Accordingly, the coolant whose temperature is reduced while passing through the chiller 30 may flow into the battery module 25 and the autonomous driving controller 36 to be more efficiently cooled.

The compressor 59 is connected between the evaporator 56 and the heat-exchanger 53 through the refrigerant line 51. The compressor 59 may compress the gaseous refrigerant, and may supply the compressed refrigerant to the heat-exchanger 53.

Meanwhile, in the present embodiment, the heat pump system may further include the gas injection part 70.

The gas injection part 70 is provided in the air conditioner 50. The gas injection part 70 may bypass some of the refrigerant that has passed through the internal condenser 52a to the compressor 59 to increase the flow rate of the refrigerant circulating in the refrigerant line 51.

The gas injection part 70 configured as described above may be selectively operated in the heating mode of the vehicle.

Conversely, the gas injection part 70 may be stopped in the cooling mode or dehumidifying mode of the vehicle.

Here, the gas injection part 70 includes a gas-liquid separator 71, a bypass line 72, a bypass valve 73, a third expansion valve 74, and a fourth expansion valve 75.

First, the gas-liquid separator 71 is provided in the refrigerant line 51 between the internal condenser 52a and the heat-exchanger 53.

The gas-liquid separator 71 may separate gaseous refrigerant and liquid refrigerant of the refrigerant completely heat-exchanged while passing through the internal condenser 52a to selectively discharge them.

The bypass line 72 connects the gas-liquid separator 71 and the compressor 59. The bypass line 72 may selectively supply the gaseous refrigerant from the gas-liquid separator 71 to the compressor 59.

That is, the bypass line 72 may connect the gas-liquid separator 71 and the compressor 59 so that the gaseous refrigerant that has passed through the gas-liquid separator 71 may selectively flow into the compressor 59.

In the present embodiment, the bypass valve 73 is provided in the bypass line 72. The bypass valve 73 may selectively open the bypass line 72 according to the vehicle mode.

Here, the gas-liquid separator 71 may supply the gaseous refrigerant to the compressor 59 through the bypass line 72 opened by the operation of the bypass valve 73. In addition, the gas-liquid separator 71 may supply a liquid refrigerant to the heat-exchanger 53.

The third expansion valve 74 is provided in the refrigerant line 51 between the internal condenser 52a and the gas-liquid separator 71.

In addition, the fourth expansion valve 75 may be provided in the refrigerant line 51 between the gas-liquid separator 71 and the heat-exchanger 53.

That is, when the gas injection unit 70 is operated in the heating mode of the vehicle, the third expansion valve 74 may expand the refrigerant supplied from the internal condenser 52a to supply it to the gas-liquid separator 71.

In addition, the fourth expansion valve 75 may expand the refrigerant supplied from the gas-liquid separator 71 to flow to the refrigerant line 51.

Conversely, when the gas injection part 70 is not operated in the heating mode of the vehicle, the third expansion valve 74 may pass the refrigerant supplied from the internal condenser 52a.

In addition, the fourth expansion valve 75 may expand the refrigerant passed through the gas-liquid separator 71 to supply it to the heat-exchanger 53.

In addition, in the cooling mode or dehumidifying mode of the vehicle, the third and fourth expansion valves 74 and 75 may not expand the refrigerant supplied from the internal condenser 52a but flow it.

Here, the heat-exchanger 53 may additionally condense or evaporate the refrigerant discharged from the gas-liquid separator 71 through heat-exchange with the external air according to the selective operation of the fourth expansion valve 75.

When the heat-exchanger 53 condenses the refrigerant, the heat-exchanger 53 further condenses the refrigerant condensed in the internal condenser 52a, so that it may increase sub-cooling of the refrigerant, thus a coefficient of performance (COP), which is a coefficient of cooling capacity to required power of a compressor, may be improved.

Meanwhile, the gas injection part 70 may further include a separate connection line (not shown) that has one end connected to the refrigerant line 51 between the internal condenser 52a and the third expansion valve 74, and the other end connected to the refrigerant line 51 that is connected to the heat-exchanger 53.

A separate on-off valve (not shown) may be provided in the separate connection line (not shown). That is, in the cooling mode of the vehicle, the connection line (not shown) is opened through the operation of the on-off valve, and in this case, the refrigerant that has passed through the internal condenser 52a may be directly supplied to the heat-exchange part 53 without passing through the gas injection part 70.

Accordingly, cooling performance may be improved by reducing the pressure of the refrigerant circulating along the refrigerant line 51 in the cooling mode of the vehicle.

The air conditioner 50 configured as described above may further include a refrigerant branch line 65 connecting the refrigerant line 51 between the heat-exchanger 53 and the first expansion valve 55 through a refrigerant valve 64 provided in the refrigerant line 51 between the heat-exchanger 53 and the gas injection part 70.

One end of the refrigerant branch line 65 is connected to the refrigerant valve 64. The other end of the refrigerant branch line 65 may be connected to the refrigerant line 51 between the heat-exchanger 53 and the first expansion valve 55.

Here, in a case of not recovering the external heat in the dehumidifying or heating mode of the vehicle, the refrigerant valve 64 may open the refrigerant branch line 65 and close a part of the refrigerant line 51 connected to the heat-exchanger 53.

In the present embodiment, the first, second, third, and fourth expansion valves 55, 63, 74, and 75 may be electronic expansion valves that selectively expand the refrigerant while controlling the flow of the refrigerant passing through the refrigerant line 51 or the refrigerant connection line 61.

In addition, the first and second valves V1 and V2, and the refrigerant valve 64, may be 3-way valves that may distribute a flow.

Hereinafter, an operation and action of the heat pump system for the vehicle according to the embodiment of the present disclosure configured as described above will be described in detail with reference to FIG. 2 to FIG. 7.

First, an operation of cooling the electrical component 15, the battery module 25, and the autonomous driving controller 26 by using a coolant in the heat pump system for the vehicle according to the embodiment of the present disclosure will be described with reference to FIG. 2.

Figure 2:
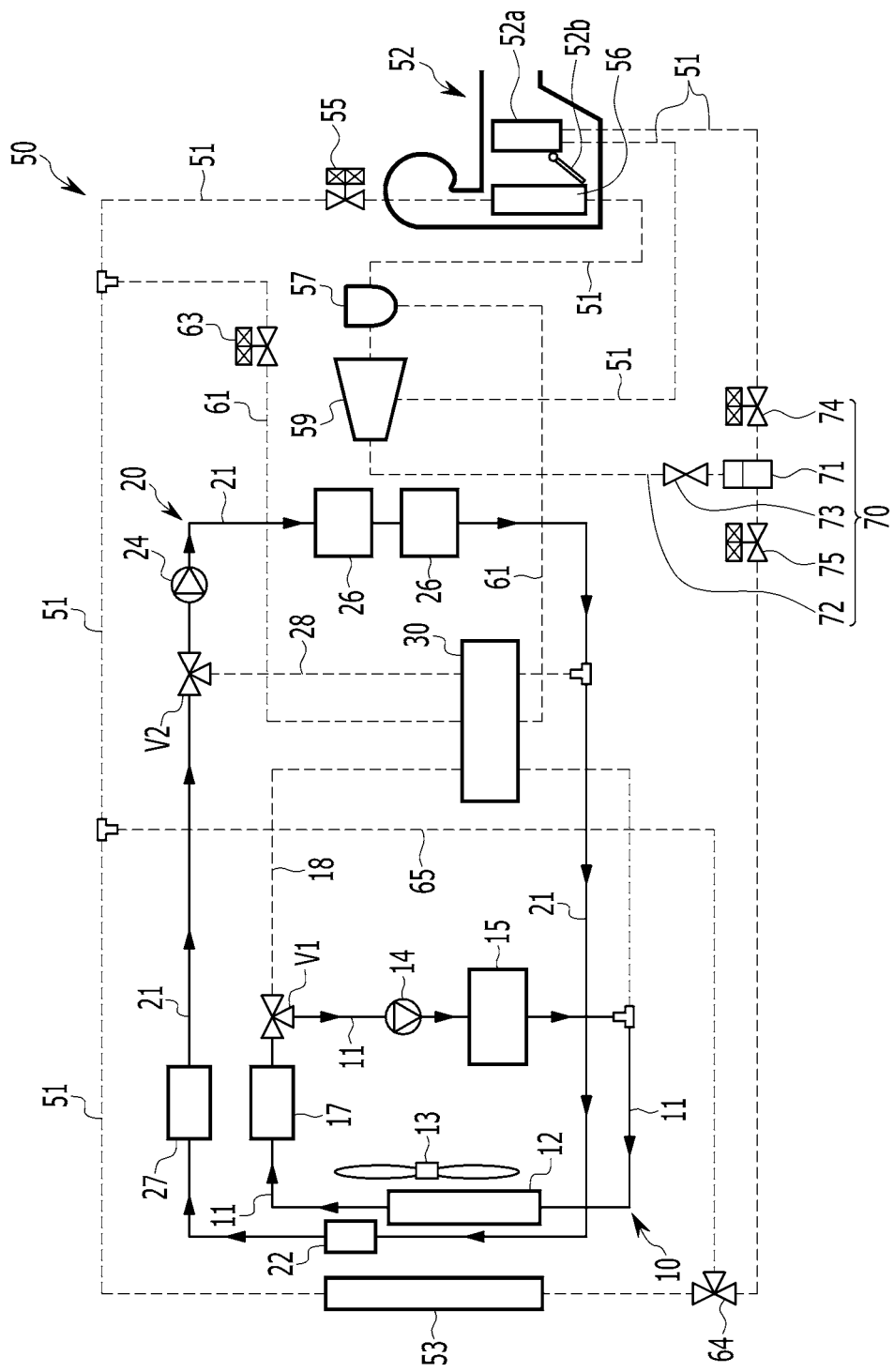
FIG. 2 illustrates an operational state diagram of cooling an electrical component, a battery module, and an autonomous driving controller by using a coolant in a heat pump system for a vehicle according to an embodiment of the present disclosure.

FIG. 2 illustrates an operational state diagram of cooling an electrical component, a battery module, and an autonomous driving controller by using a coolant in a heat pump system for a vehicle according to an embodiment of the present disclosure.

Referring to FIG. 2, the first branch line 18 is closed through the operation of the first valve V1. The second branch line 28 is closed through the operation of the second valve V2.

In this state, in the first cooling apparatus 10, the first water pump 14 operates so as to cool the electrical component 15. Accordingly, the electrical component 15 is supplied with the coolant that is cooled by the first radiator 12 and stored in the first reservoir tank 17.

Therefore, the electrical component 15 may be efficiently cooled.

In the second cooling apparatus 20, the second water pump 24 is operated to cool the battery module 25 and the autonomous driving controller 26.

Then, while the coolant cooled by the second radiator 22 and stored in the second reservoir tank 27 is circulated along the second coolant line 21 by the operation of the second water pumps 24, it is supplied to the battery module 25 and the autonomous driving controller 26.

The coolant that has cooled the battery module 25 and the autonomous driving controller 26 flows into the second radiator 22 along the second coolant line 21.

That is, since the low temperature coolant cooled by the second radiator 22 cools only the battery module 25 and the autonomous driving controller 26, the battery module 25 and the autonomous driving controller 26 may be efficiently cooled.

As described above, while the coolant cooled by the first and second radiators 12 and 22 and stored in the first and second reservoir tanks 17 and 27 is circulated in the first coolant line 11 and the second coolant line 21, respectively, through the operation of the first and second water pumps 14 and 24, since it cools the electrical component 15, the battery module 25, and the autonomous driving controller 26, respectively, the electrical component 15, the battery module 25, and the autonomous driving controller 26 may be efficiently cooled.

The air conditioner 50 and the gas injection part 70 do not operate.

Meanwhile, in the present embodiment, the electrical component 15, the battery module 25, and the autonomous driving controller 26 are all cooled with the coolant cooled by the first and second radiators 12 and 22, respectively, but the present disclosure is not limited thereto, and when one of the electrical component 15, the battery module 25, and the autonomous driving controller 26 is separately cooled, the first and second water pumps 14 and 24 may be selectively operated.

An operation of cooling the battery module 25 and the autonomous driving controller 26 in the cooling mode of the vehicle will be described with reference to FIG. 3.

Figure 3:
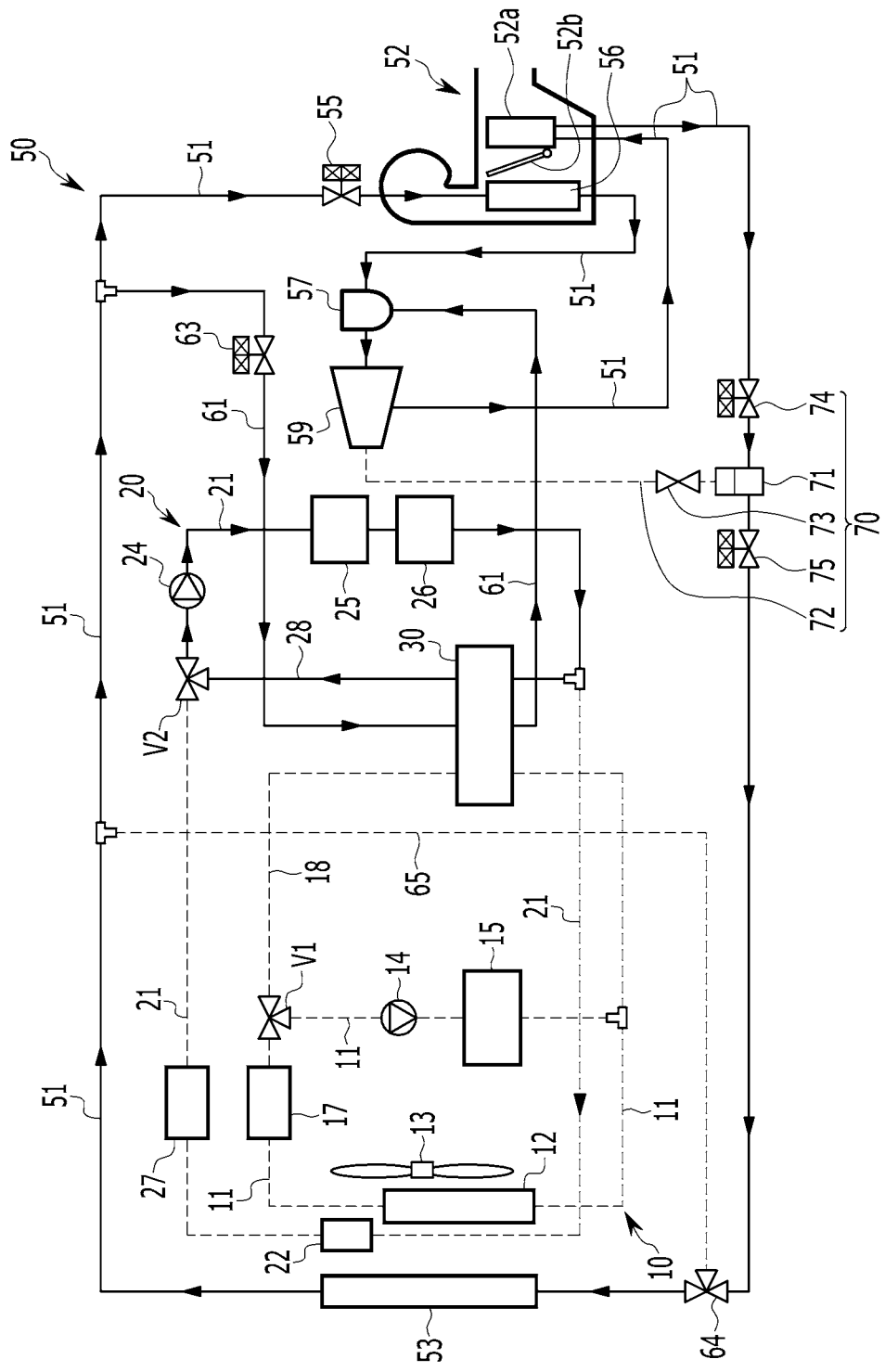
FIG. 3 illustrates an operational state diagram of cooling a battery module and an autonomous driving controller by using a refrigerant in a cooling mode in a heat pump system for a vehicle according to an embodiment of the present disclosure.

FIG. 3 illustrates an operational state diagram of cooling a battery module and an autonomous driving controller by using a refrigerant in a cooling mode in a heat pump system for a vehicle according to an embodiment of the present disclosure.

Referring to FIG. 3, the first cooling apparatus 10 stops operation.

The second branch line 28 is opened through the operation of the second valve V2. Accordingly, the second coolant line 21 connected to the second radiator 22 based on the second branch line 28 is closed.

Accordingly, in the second cooling apparatus 20, the coolant passing through the chiller 30 is supplied to the battery module 25 and the autonomous driving controller 25 along the opened second branch line 28 and the opened second coolant line 21 through the operation of the second water pump 24.

The coolant passing through the battery module 25 and the autonomous driving controller 26 flows into the chiller 30. The coolant that has passed the chiller 30 may be supplied to the battery module 25 and the autonomous driving controller 26 without passing through the second radiator 22 while circulating along the opened second coolant line 21 and the second branch line 28.

In the air conditioner 50, each constituent element thereof operates to cool the interior of the vehicle. Accordingly, the refrigerant is circulated along the refrigerant line 51.

Here, the refrigerant line 51 connecting the heat-exchanger 53 and the evaporator 56 is opened through the operation of the first expansion valve 55. The refrigerant connection line 61 is opened through the operation of the second expansion valve 63.

Then, the refrigerant that has passed through the heat-exchanger 53 may be circulated along the refrigerant line 51 and the refrigerant connection line 61.

Here, the first and second expansion valves 55 and 63 may expand the refrigerant so that the expanded refrigerant may be supplied to the evaporator 56 and the chiller 30, respectively.

Meanwhile, the coolant passing through the chiller 30 circulates in the second coolant line 21 and the second branch line 28 without passing through the second radiator 22 to cool the battery module 25 and the autonomous driving controller 26 through the operation of the second water pump 24.

The coolant passing through the chiller 30 is cooled through heat-exchange with the expanded refrigerant supplied to the chiller 30. The coolant cooled in the chiller 30 is supplied to the battery module 25 and the autonomous driving controller 26. Accordingly, the battery module 25 and the autonomous driving controller 26 are cooled by the cooled coolant.

That is, the second expansion valve 63 expands some of the refrigerant that has passed through the heat-exchanger 53 to supply the expanded refrigerant to the chiller 30, and opens the refrigerant connection line 61.

Therefore, some of the refrigerant discharged from the heat-exchanger 53 is expanded through the operation of the second expansion valve 63 to enter a low temperature and low pressure state, and flows into the chiller 30 connected to the refrigerant connection line 61.

Then, the refrigerant flowing into the chiller 30 is heat-exchanged with the coolant, passes through the accumulator 57 through the refrigerant connection line 61, and then flows into the compressor 59.

The coolant whose temperature rises while cooling the battery module 25 and the autonomous driving controller 26 is cooled through heat-exchange with a low temperature and low pressure refrigerant in the chiller 30. The cooled coolant is supplied back to the battery module 25 and the autonomous driving controller 26 through the second coolant line 21 and the second branch line 28.

That is, the coolant may efficiently cool the battery module 25 and the autonomous driving controller 26 while repeatedly performing the above-described operation.

Meanwhile, the remaining refrigerant discharged from the heat-exchanger 53 flows through the refrigerant line 51 to cool the interior of the vehicle, and sequentially passes through the first expansion valve 55, the evaporator 56, and the compressor 59.

Here, the external air flowing into the HVAC module 52 is cooled while passing through the evaporator 56 by the low-temperature refrigerant flowing into the evaporator 56.

In this case, a part of the opening/closing door 52*b* passing through the internal condenser 52*a* is closed so that the cooled outside air does not pass through the internal condenser 52*a*. Accordingly, the cooled outside air directly flows into the interior of the vehicle, thereby cooling the vehicle interior.

Meanwhile, the refrigerant with an increased condensation amount while sequentially passing through the internal condenser 52*a* and the heat-exchanger 53 is expanded and supplied to the evaporator 56, so that the refrigerant may be evaporated at a lower temperature.

That is, in the present embodiment, the internal condenser 52*a* condenses the refrigerant, and the heat-exchanger 53 additionally condenses the refrigerant, thereby advantageously sub-cooling the refrigerant.

In addition, as the refrigerant that is sub-cooled is evaporated at a lower temperature in the evaporator 56, the temperature of the outside air passing through the evaporator 56 may be further lowered, thereby improving cooling performance and efficiency.

Meanwhile, the operation of the gas injection part 70 stops. Here, the refrigerant discharged from the internal condenser 52*a* may be supplied to the heat-exchanger without expansion in the third and fourth expansion valves 74 and 75.

While repeating the above-described process, the refrigerant may cool the interior in the cooling mode of the vehicle, and at the same time, it may cool the coolant through heat-exchange while passing through the chiller 30.

The low temperature coolant cooled in the chiller 30 flows into the battery module 25 and the autonomous driving controller 26. Accordingly, the battery module 25 and the autonomous driving controller 26 may be efficiently cooled by the supplied low temperature coolant.

In the present embodiment, an operation of recovering waste heat from an external heat source, the electrical component 15, the battery module 25, and the autonomous driving controller 26 in the heating mode of the vehicle will be described with reference to FIG. 4.

Figure 4:
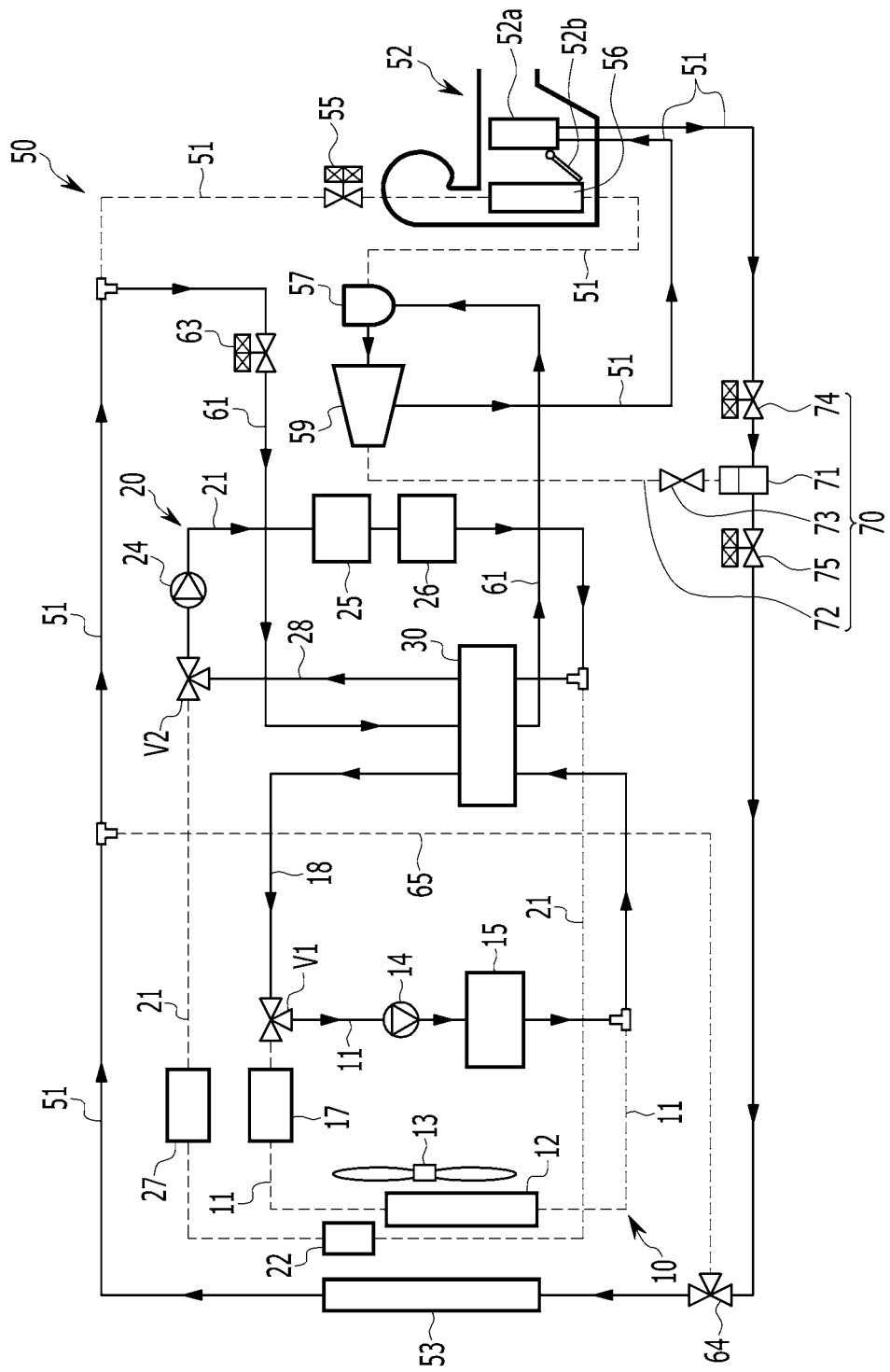
FIG. 4 illustrates an operational state diagram of waste heat recovery from an external heat source, an electrical component, a battery module, and an autonomous driving controller according to a heating mode in a heat pump system for a vehicle according to an embodiment of the present disclosure.

FIG. 4 illustrates an operational state diagram of waste heat recovery from an external heat source, an electrical component, a battery module, and an autonomous driving controller according to a heating mode in a heat pump system for a vehicle according to an embodiment of the present disclosure.

Referring to FIG. 4, the heat pump system may absorb the external heat from the external air together with the waste heat from the electrical component 15, the battery module 25, and the autonomous driving controller 26 during an initial starting idle (IDLE) state of the vehicle or initial driving that lacks the waste heat from the electrical component 15.

First, in the cooling apparatus 10, the first water pump 14 is operated to circulate the coolant.

Here, the first coolant line 11 connected to the electrical component 15 is opened through the operation of the first valve V1. At the same time, in a state in which the first coolant line 11 connected to the first radiator 12 is closed through the operation of the first valve V1, the first branch line 18 is opened.

In this state, the coolant that has passed through the electrical component 15 may be supplied to the chiller 30 along the opened first coolant line 11 and the first branch line 18 without passing through the first radiator 12 through the operation of the first water pump 14.

Meanwhile, in the second cooling apparatus 20, the second branch line 28 is opened through the operation of the second valve V2. In this state, based on the second branch line 28, the second coolant line 21 connected to the second radiator 22 is closed through the operation of the second valve V2.

Accordingly, in the second cooling apparatus 20, the coolant passing through the battery module 25 and the autonomous driving controller 26 through the operation of the second water pump 24 may be supplied to the chiller 30 through the second branch line 28.

That is, in the first cooling apparatus 10, the opened first branch line 18 and a part of the first coolant line 11 connected to the electrical component 15 are connected.

In addition, in the second cooling apparatus 20, based on the second branch line 28, the battery module 25, and a part of the second coolant line 21 connected to the autonomous driving controller 26, are connected to the second branch line 28, respectively.

Then, the coolant that has passed through the electrical component 15 is continuously circulated along the opened first coolant line 11 and the first branch line 18 without passing through the first radiator 12, and absorbs waste heat from the electrical component 15, thus the temperature of the coolant rises.

In addition, while the coolant passing through the battery module 25 and the autonomous driving controller 26 is continuously circulated along the opened second coolant line 21 and the second branch line 28 without passing through the second radiator 22, it absorbs waste heat from the battery module 25 and the autonomous driving controller 26 so that the temperature thereof rises.

The coolant with the risen temperature may be supplied to the chiller 30 to which the first and second branch lines 18 and 28 are connected, respectively. That is, the waste heat generated from the electrical component 15, the battery module 25, and the autonomous driving controller 26 increases the temperature of the coolant circulating in the first coolant line 11 and the second coolant line 21, respectively.

In the air conditioner 50, each constituent element thereof operates to heat the interior of the vehicle. Accordingly, the refrigerant is circulated along the refrigerant line 51.

Here, the refrigerant line 51 connecting the heat-exchanger 53 and the evaporator 56 is closed through the operation of the first expansion valve 55.

The refrigerant connection line 61 is opened through the operation of the second expansion valve 63.

The second expansion valve 63 may expand the refrigerant supplied from the heat-exchanger 53 to the refrigerant connection line 61 to supply it to the chiller 30.

Here, the fourth expansion valve 75 of the gas injection part 70 may expand the refrigerant supplied from the internal condenser 52*a* to supply it to the heat-exchanger 53.

Accordingly, the heat-exchanger 53 recovers the external heat while evaporating the expanded refrigerant through heat-exchange between the expanded refrigerant and the external air.

In addition, while the coolant of which temperature has risen by absorbing waste heat from the electrical component 15, the battery module 25, and the autonomous driving controller 36 passes through the chiller 30 through the operation of the first and second water pumps 14 and 24, it increases the temperature of the refrigerant supplied to the chiller 30, and then is recovered.

That is, the chiller 30 receives the refrigerant that is supplied from the heat-exchanger 53 and expanded through the operation of the second expansion valve 63, through the refrigerant connection line 61; and evaporates the supplied refrigerant through heat-exchange with the coolant of which temperature has risen while passing through the electrical component 15, the battery module 25, and the autonomous driving controller 26, respectively, thereby recovering the waste heat from the electrical component 15, the battery module 25, and the autonomous driving controller.

Then, the refrigerant passing through the chiller 30 is supplied to the accumulator 57 along the refrigerant connection line 61.

The refrigerant supplied to the accumulator 57 is separated into gas and liquid. The gaseous refrigerant of the refrigerant separated into gas and liquid is supplied to the compressor 59.

The refrigerant compressed at a high temperature and high pressure in the compressor 59 flows into the internal condenser 52a.

Here, the refrigerant supplied to the internal condenser 52a may increase the temperature of the external air flowing into the HVAC module 52.

The opening/closing door 52b is opened so that the external air that flows into the HVAC module 52 and then passes through the evaporator 56 passes through the internal condenser 52a.

Accordingly, the external air flowing from the outside flows in an uncooled state when passing through the evaporator 56 to which no refrigerant is supplied. The flowed external air is converted to a high temperature state while passing through the internal condenser 52a to flow into the vehicle interior, so that the vehicle interior may be heated.

In the present embodiment, an operation of the gas injection part 70, while recovering waste heat from an external heat source, the electrical component 15, the battery module 25, and the autonomous driving controller 26 in the heating mode of the vehicle, will be described with reference to FIG. 5.

Figure 5:
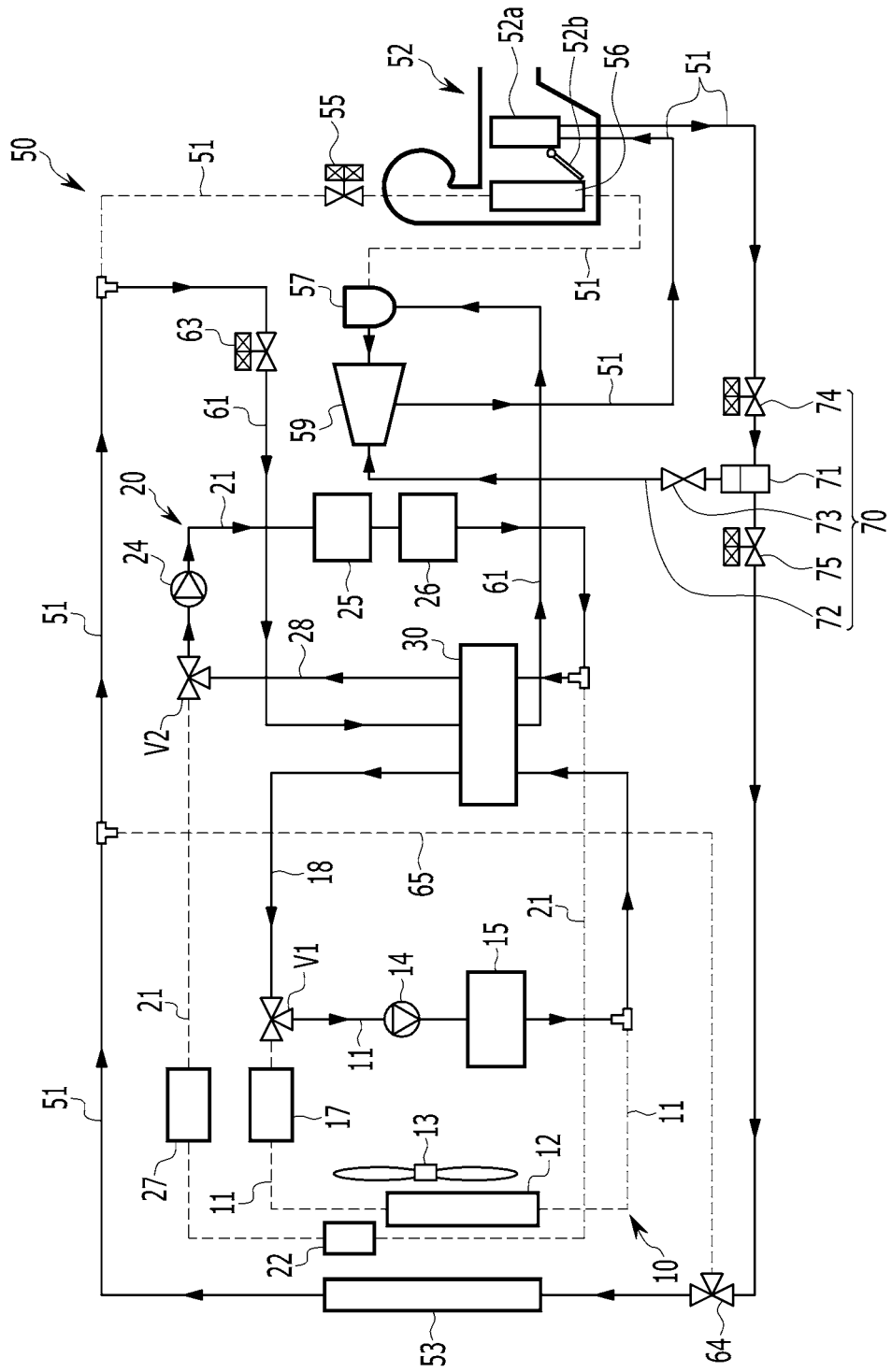
FIG. 5 illustrates an operational state diagram of waste heat recovery from an external heat source, an electrical component, a battery module, and an autonomous driving controller according to a heating mode, and an operation of a gas injection part, in a heat pump system for a vehicle according to an embodiment of the present disclosure.

FIG. 5 illustrates an operational state diagram of waste heat recovery from an external heat source, an electrical component, a battery module, and an autonomous driving controller according to a heating mode, and an operation of a gas injection part, in a heat pump system for a vehicle according to an embodiment of the present disclosure.

Referring to FIG. 5, the heat pump system may absorb the external heat from the external air together with the waste heat from the electrical component 15, the battery module 25, and the autonomous driving controller 26 during an initial starting idle (IDLE) state of the vehicle or initial driving that lacks the waste heat from the electrical component 15.

First, in the cooling apparatus 10, the first water pump 14 is operated to circulate the coolant.

Here, the first coolant line 11 connected to the electrical component 15 is opened through the operation of the first valve V1. At the same time, in a state in which the first coolant line 11 connected to the first radiator 12 is closed through the operation of the first valve V1, the first branch line 18 is opened.

In this state, the coolant that has passed through the electrical component 15 may be supplied to the chiller 30 along the opened first coolant line 11 and the first branch line 18 without passing through the first radiator 12 through the operation of the first water pump 14.

Meanwhile, in the second cooling apparatus 20, the second branch line 28 is opened through the operation of the second valve V2. In this state, based on the second branch line 28, the second coolant line 21 connected to the second radiator 22 is closed through the operation of the second valve V2.

Accordingly, in the second cooling apparatus 20, the coolant passing through the battery module 25 and the autonomous driving controller 26 through the operation of the second water pump 24 may be supplied to the chiller 30 through the second branch line 28.

That is, in the first cooling apparatus 10, the opened first branch line 18 and a part of the first coolant line 11 connected to the electrical component 15 are connected.

In addition, in the second cooling apparatus 20, based on the second branch line 28, the battery module 25, and a part of the second coolant line 21 connected to the autonomous driving controller 26, are connected to the second branch line 28, respectively.

Then, the coolant that has passed through the electrical component 15 is continuously circulated along the opened first coolant line 11 and the first branch line 18 without passing through the first radiator 12, and absorbs waste heat from the electrical component 15, thus the temperature of the coolant rises.

In addition, while the coolant passing through the battery module 25 and the autonomous driving controller 26 is continuously circulated along the opened second coolant line 21 and the second branch line 28 without passing through the second radiator 22, it absorbs waste heat from the battery module 25 and the autonomous driving controller 26 so that the temperature thereof rises.

The coolant with the risen temperature may be supplied to the chiller 30 to which the first and second branch lines 18 and 28 are connected, respectively. That is, the waste heat generated from the electrical component 15, the battery module 25, and the autonomous driving controller 26 increases the temperature of the coolant circulating in the first coolant line 11 and the second coolant line 21, respectively.

In the air conditioner 50, each constituent element thereof operates to heat the interior of the vehicle. Accordingly, the refrigerant is circulated along the refrigerant line 51.

Here, the refrigerant line 51 connecting the heat-exchanger 53 and the evaporator 56 is closed through the operation of the first expansion valve 55.

The refrigerant connection line 61 is opened through the operation of the second expansion valve 63.

The second expansion valve 63 may expand the refrigerant supplied from the heat-exchanger 53 to the refrigerant connection line 61 to supply it to the chiller 30.

Here, the fourth expansion valve 75 of the gas injection part 70 may expand the refrigerant supplied from the internal condenser 52a to supply it to the heat-exchanger 53.

Accordingly, the heat-exchanger 53 recovers the external heat while evaporating the expanded refrigerant through heat-exchange between the expanded refrigerant and the external air.

In addition, while the coolant of which temperature has risen by absorbing waste heat from the electrical component 15, the battery module 25, and the autonomous driving controller 36 passes through the chiller 30 through the operation of the first and second water pumps 14 and 24, it increases the temperature of the refrigerant supplied to the chiller 30, and then is recovered.

That is, the chiller 30 receives the refrigerant that is supplied from the heat-exchanger 53 and expanded through the operation of the second expansion valve 63, through the refrigerant connection line 61, and evaporates the supplied refrigerant through heat-exchange with the coolant of which temperature has risen while passing through the electrical component 15, the battery module 25, and the autonomous driving controller 26, respectively, thereby recovering the waste heat from the electrical component 15, the battery module 25, and the autonomous driving controller.

Then, the refrigerant passing through the chiller 30 is supplied to the accumulator 57 along the refrigerant connection line 61.

The refrigerant supplied to the accumulator 57 is separated into gas and liquid. The gaseous refrigerant of the refrigerant separated into gas and liquid is supplied to the compressor 59.

The refrigerant compressed at a high temperature and high pressure in the compressor 59 flows into the internal condenser 52a.

Here, the refrigerant supplied to the internal condenser 52a may increase the temperature of the external air flowing into the HVAC module 52.

The opening/closing door 52b is opened so that the external air that flows into the HVAC module 52 and then passes through the evaporator 56 passes through the internal condenser 52a.

Accordingly, the external air flowing from the outside flows in an uncooled state when passing through the evaporator 56 to which no refrigerant is supplied. The flowed external air is converted to a high temperature state while passing through the internal condenser 52a to flow into the vehicle interior, so that the vehicle interior may be heated.

Here, when the gas injection part 70 is operated, the bypass line 72 is opened through the operation of the bypass valve 73.

In this state, the third expansion valve 74 expands the refrigerant supplied from the internal condenser 52a to supply it to the gas-liquid separator 71.

Among the refrigerant supplied to the gas-liquid separator 71, the gaseous refrigerant is supplied to the compressor 59 through the opened bypass line 72.

That is, the gas injection part 70 flows the gaseous refrigerant heat-exchanged while passing through the gas-liquid separator 71 back into the compressor 59 through the bypass line 72, thereby increasing the flow rate of the refrigerant circulating in the refrigerant line 51.

In addition, the liquid refrigerant discharged from the gas-liquid separator 71 through the refrigerant line 51 flows into the heat-exchange machine 53 along the refrigerant line 51 opened through the operation of the fourth expansion valve 75.

In this case, the fourth expansion valve 75 may expand the refrigerant supplied from the gas-liquid separator 17.

That is, the gas-liquid separator 71 of the gas injection part 70 may bypass the gaseous refrigerant to the compressor 59 through the bypass line 72, and may supply the liquid refrigerant to the fourth expansion valve 75.

Then, the refrigerant may be expanded while passing through the fourth expansion valve 75, and may be evaporated through heat-exchange with the external air in the heat-exchanger 53.

In addition, the refrigerant may smoothly recover the waste heat from the coolant of which temperature has risen while passing through the electrical component 15 and the battery module 25 from the chiller 30, thereby improving heating performance and efficiency.

That is, the heat pump system according to the present embodiment absorbs the external heat in the heat-exchanger 53 when heating is required in an initial starting idle state (IDLE) state or in an initial running state of the vehicle, and it increases the temperature of the refrigerant by using the waste heat of the electrical component 15, the battery module 25, and the autonomous driving controller 26, so that the power consumption of the compressor 59 may be reduced, and the heating efficiency may be improved.

In addition, the present disclosure may improve heating efficiency and performance while minimizing a use amount of a separate electric heater.

Furthermore, the gas injection part 70 may maximize the heating performance by increasing the flow rate of the refrigerant circulating in the refrigerant line 51.

Meanwhile, in the present embodiment, it has been described that the case of recovering together the waste heat from the electrical component 15, the battery module 25, and the autonomous driving controller 26 as an example, but the present disclosure is not limited thereto, and the waste heat from the electrical component 15, or the waste heat from the battery module 25 and the autonomous driving controller 26, may be selectively recovered.

That is, when the waste heat from the electrical component 15 is not recovered, the operation of the first cooling apparatus 10 may be stopped, and when the waste heat from the battery module 25 and the autonomous driving controller 26 is not recovered, the operation of the second cooling apparatus 20 may be stopped.

In the present embodiment, a case of operating the gas injection unit 70 while recovering the waste heat from the electrical component 15 in the heating mode of the vehicle will be described with reference to FIG. 6.

Figure 6:
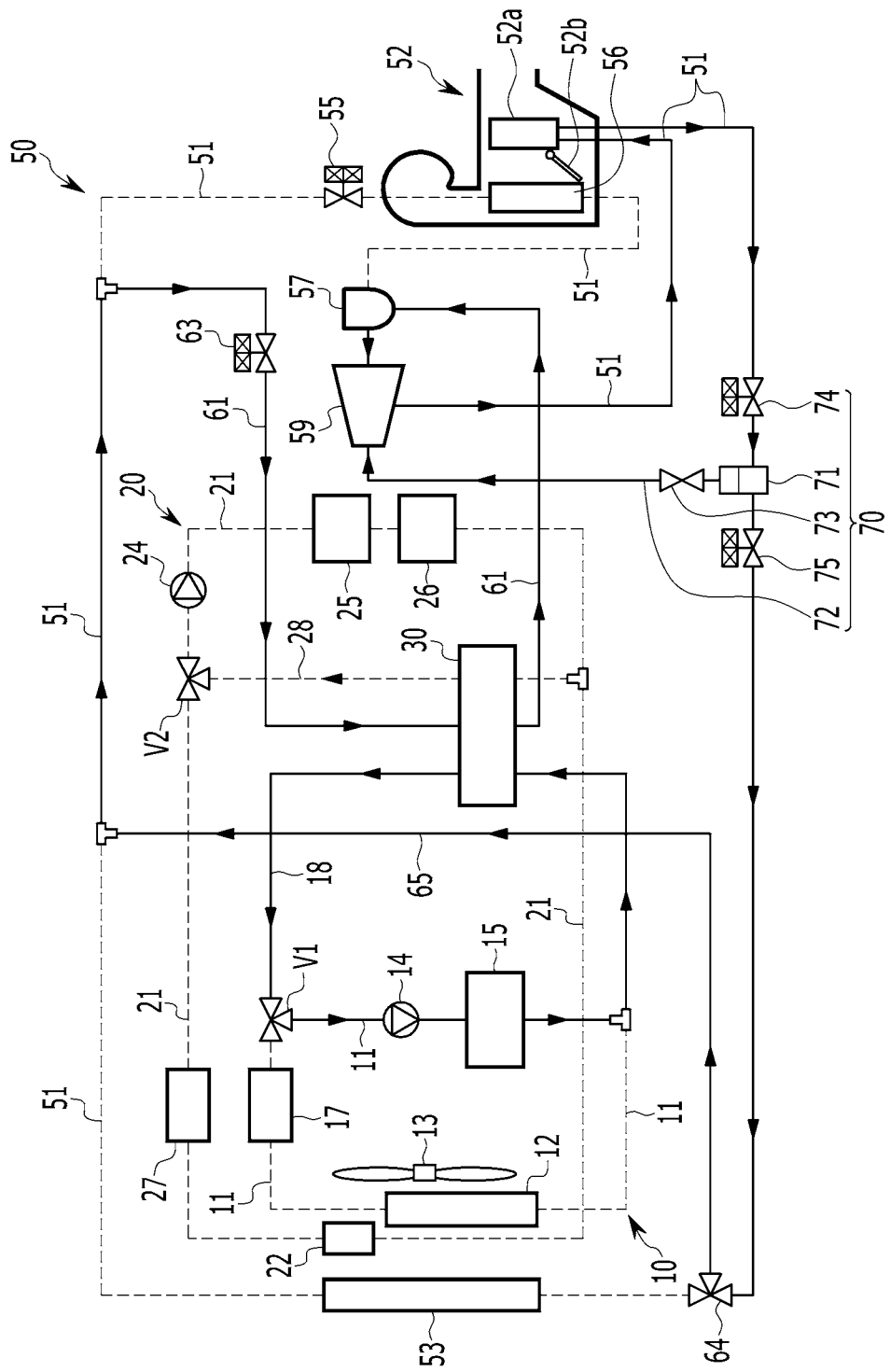
FIG. 6 illustrates an operational state diagram of waste heat recovery from an electrical component, and an operation of a gas injection part according to a heating mode in a heat pump system for a vehicle according to an embodiment of the present disclosure.

FIG. 6 illustrates an operational state diagram of waste heat recovery from an electrical component, and an operation of a gas injection part according to a heating mode in a heat pump system for a vehicle, according to an embodiment of the present disclosure.

Referring to FIG. 6, the heat pump system may recover the waste heat from the electrical component 15 to use it for indoor heating.

First, in the cooling apparatus 10, the first water pump 14 is operated to circulate the coolant.

Here, the first coolant line 11 connected to the electrical component 15 is opened through the operation of the first valve V1. At the same time, in a state in which the first coolant line 11 connected to the first radiator 12 is closed through the operation of the first valve V1, the first branch line 18 is opened.

In this state, the coolant that has passed through the electrical component 15 may be supplied to the chiller 30 along the opened first coolant line 11 and the first branch line 18 without passing through the first radiator 12 through the operation of the first water pump 14.

Meanwhile, the operation of the second cooling apparatus 20 is stopped.

That is, in the first cooling apparatus 10, the opened first branch line 18 and a part of the first coolant line 11 connected to the electrical component 15 are connected.

Then, the coolant that has passed through the electrical component 15 is continuously circulated along the opened first coolant line 11 and the first branch line 18 without passing through the first radiator 12, and absorbs waste heat from the electrical component 15, thus the temperature of the coolant rises.

The coolant with the risen temperature may be supplied to the chiller 30 to which the first branch line 18 is connected. That is, the waste heat generated from the electrical component 15 raises the temperature of the coolant circulating in the first coolant line 11.

In the air conditioner 50, each constituent element thereof operates to heat the interior of the vehicle. Accordingly, the refrigerant is circulated along the refrigerant line 51.

Here, the refrigerant line 51 connecting the heat-exchanger 53 and the evaporator 56 is closed through the operation of the first expansion valve 55.

The refrigerant connection line 61 is opened through the operation of the second expansion valve 63.

The second expansion valve 63 may expand the refrigerant supplied from the heat-exchanger 53 to the refrigerant connection line 61 to supply it to the chiller 30.

Here, the fourth expansion valve 75 of the gas injection part 70 may expand the refrigerant supplied from the internal condenser 52*a*.

Meanwhile, while the coolant of which temperature has risen by absorbing the waste heat of the electrical component 15 passes through the chiller 30 through the operation of the first water pump 14, it is recovered while increasing the temperature of the refrigerant supplied to the chiller 30.

That is, the chiller 30 receives the refrigerant that is supplied from the heat-exchanger 53 and expanded through the operation of the second expansion valve 63, through the refrigerant connection line 61, and evaporates the supplied refrigerant through heat-exchange with the coolant of which temperature has risen while passing through the electrical component 15, thereby recovering the waste heat from the electrical component 15.

Then, the refrigerant passing through the chiller 30 is supplied to the accumulator 57 along the refrigerant connection line 61.

The refrigerant supplied to the accumulator 57 is separated into gas and liquid. The gaseous refrigerant of the refrigerant separated into gas and liquid is supplied to the compressor 59.

The refrigerant compressed at a high temperature and high pressure in the compressor 59 flows into the internal condenser 52*a*.

Here, the refrigerant supplied to the internal condenser 52*a* may increase the temperature of the external air flowing into the HVAC module 52.

The opening/closing door 52*b* is opened so that the external air that flows into the HVAC module 52 and then passes through the evaporator 56 passes through the internal condenser 52*a*.

Accordingly, the external air flowing from the outside flows in an uncooled state when passing through the evaporator 56 to which no refrigerant is supplied. The flowed external air is converted to a high temperature state while passing through the internal condenser 52*a* to flow into the vehicle interior, so that the vehicle interior may be heated.

Here, in the gas injection part 70, the bypass line 72 is opened through the operation of the bypass valve 73.

In this state, the third expansion valve 74 expands the refrigerant supplied from the internal condenser 52*a* to supply it to the gas-liquid separator 71.

Among the refrigerant supplied to the gas-liquid separator 71, the gaseous refrigerant is supplied to the compressor 59 through the opened bypass line 72.

That is, the gas injection part 70 flows the gaseous refrigerant heat-exchanged while passing through the gas-liquid separator 71 back into the compressor 59 through the bypass line 72, thereby increasing the flow rate of the refrigerant circulating in the refrigerant line 51.

In addition, the liquid refrigerant discharged from the gas-liquid separator 71 through the refrigerant line 51 flows into the refrigerant line 51 in an expanded state through the operation of the fourth expansion valve 75.

Here, the refrigerant valve 64 may open the refrigerant branch line 65 so that the refrigerant expanded while passing through the fourth expansion valve 75 may not be supplied to the heat-exchanger 53.

Accordingly, the refrigerant flowing into the refrigerant branch line 65 through the refrigerant valve 64 may flow into the opened refrigerant connection line 61 through the operation of the second expansion valve 63.

That is, the gas-liquid separator 71 of the gas injection part 70 may bypass the gaseous refrigerant to the compressor 59 through the bypass line 72, and may supply the liquid refrigerant to the fourth expansion valve 75.

Then, the refrigerant is expanded while passing through the fourth expansion valve 75, and is supplied to the chiller 30 along the refrigerant branch line 65 and the refrigerant connection line 61. The refrigerant supplied to the chiller 30 may be evaporated through heat-exchange with the coolant supplied through the first branch line 18.

In addition, the refrigerant may smoothly recover the waste heat from the coolant of which temperature has risen while passing through the electrical component 15 from the chiller 30, thereby improving heating performance and efficiency.

That is, the heat pump system according to the present embodiment uses the waste heat of the electrical component 15 to increase the temperature of the refrigerant in the heating mode of the vehicle, thereby reducing power consumption of the compressor 59 and improving heating efficiency.

In addition, the present disclosure may improve heating efficiency and performance while minimizing a use amount of a separate electric heater.

Furthermore, the gas injection part 70 may maximize the heating performance by increasing the flow rate of the refrigerant circulating in the refrigerant line 51.

In the present embodiment, an operation for a dehumidifying mode of a vehicle will be described with reference to FIG. 7.

Figure 7:
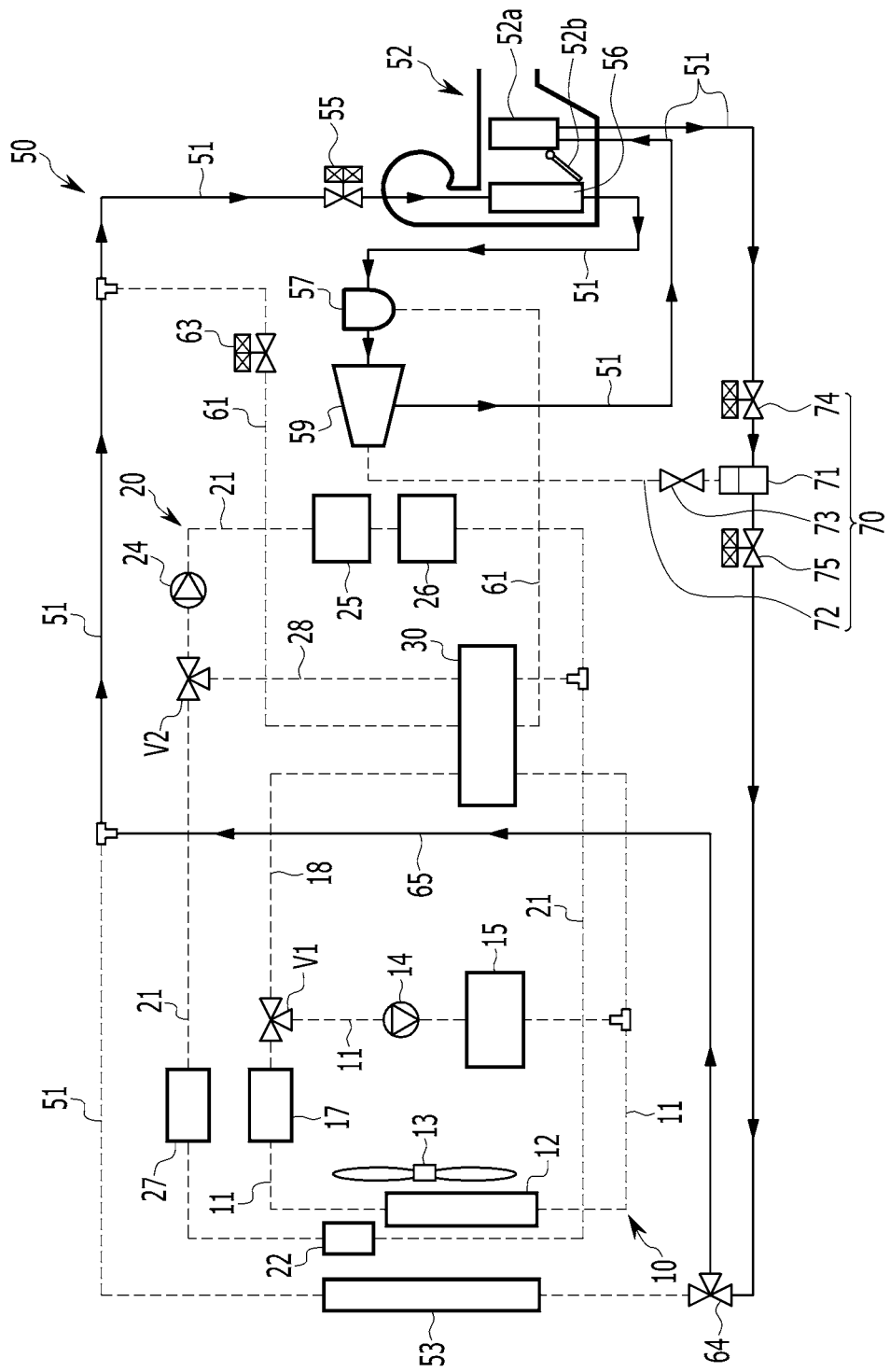
FIG. 7 illustrates an operational state diagram of a dehumidifying mode in a heat pump system for a vehicle according to an embodiment of the present disclosure.

FIG. 7 illustrates an operational state diagram of a dehumidifying mode in a heat pump system for a vehicle according to an embodiment of the present disclosure.

Referring to FIG. 7, the heat pump system may perform the dehumidifying mode while heating the vehicle interior.

First, the operation of the first and second cooling apparatuses 10 and 20 is stopped.

In the air conditioner 50, each constituent element thereof operates to heat and dehumidify the interior of the vehicle. Accordingly, the refrigerant is circulated along the refrigerant line 51.

In this case, the operation of the gas injection part 70 may stop.

The refrigerant line 51 connecting the heat-exchanger 53 and the evaporator 56 is opened through the operation of the first expansion valve 55.

The refrigerant connection line 61 is closed through the operation of the second expansion valve 63.

Here, the first expansion valve 55 may expand the refrigerant supplied to the refrigerant line 51 so that the expanded refrigerant may be supplied to the evaporator 56.

In addition, the third and fourth expansion valves 74 and 75 may not expand the refrigerant supplied from the internal condenser 52*a* but flow it.

In the present embodiment, the refrigerant valve 64 may open the refrigerant branch line 65 so that the refrigerant supplied from the internal condenser 52*a* may not be supplied to the heat-exchanger 53.

Accordingly, the refrigerant flowing into the refrigerant branch line 65 through the refrigerant valve 64 may flow into the evaporator 56 along the opened refrigerant line 51 through the operation of the first expansion valve 55.

The expanded refrigerant supplied to the evaporator 56 through the operation of the first expansion valve 55 is heat-exchanged with the external air passing through the evaporator 56, and then is supplied to the compressor 59 through the accumulator 57 along the refrigerant line 51.

In addition, the refrigerant compressed at a high temperature and high pressure in the compressor 59 flows into the internal condenser 52*a*.

Here, the opening/closing door 52*b* is opened so that the external air that flows into the HVAC module 52 and then passes through the evaporator 56 passes through the internal condenser 52*a*.

That is, the external air flowing into the HVAC module 52 is dehumidified while passing through the evaporator 56 by the low-temperature refrigerant flowing into the evaporator 56. Then, while passing through the internal condenser 52*a*, it is converted into a high temperature state to flow into the interior of the vehicle, thereby heating and dehumidifying the interior of the vehicle.

Therefore, as described above, according to the heat pump system for the vehicle according to the embodiment of the present disclosure, by controlling the temperature of the battery module 25 and the autonomous driving controller 26 according to the mode of the vehicle by using one chiller 30 in which the coolant and the refrigerant are heat-exchanged, the entire system may be simplified.

In addition, the present disclosure may operate the battery module 25 in an optimum performance state by efficiently controlling the temperature of the battery module 25, and the total traveling distance of the vehicle may be increased through the efficient management of the battery module 25.

In addition, the present disclosure may improve heating efficiency by selectively using an external heat source, or the waste heat of the electrical component 15, the battery module 25, or the autonomous driving controller 26 in the heating mode of the vehicle.

In addition, the present disclosure may maximize the heating performance by selectively increasing the flow rate of the refrigerant in the heating mode by applying the gas injection part 70.

Furthermore, the present disclosure may reduce the manufacturing cost and weight through simplification of the entire system, and may improve space utilization.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

The invention claimed is:

1. A heat pump system for a vehicle, comprising:
 a first cooling apparatus including a first radiator, a first water pump, and a first valve that are connected by a first coolant line, wherein the first cooling apparatus is configured to circulate a first coolant in the first coolant line to cool at least one electrical component provided in the first coolant line;
 a second cooling apparatus including a second radiator, a second water pump, a battery module, an autonomous driving controller, and a second valve that are connected by a second coolant line, wherein the second cooling apparatus is configured to circulate a second coolant to the battery module and the autonomous driving controller;
 a chiller through which a first branch line connected to the first coolant line through the first valve, and a second branch line connected to the second coolant line through the second valve respectively pass, the chiller being connected to a refrigerant line of an air conditioner through a refrigerant connection line, wherein the chiller is configured to control a temperature of the second coolant by heat-exchanging the second coolant selectively inflowing through the first branch line or the second branch line with a refrigerant supplied from the air conditioner; and
 a gas injection part provided in the air conditioner and increasing a flow rate of the refrigerant circulating in the refrigerant line by bypassing some of the refrigerant passing through an internal condenser to a compressor.

2. The heat pump system for the vehicle of claim 1, wherein:
 one end of the first branch line is connected to the first coolant line through the first valve, and an other end of the first branch line is connected to the first coolant line connected to the electrical component; and
 one end of the second branch line is connected to the second coolant line through the second valve provided in the second coolant line between the second radiator and the second water pump, and an other end of the second branch line is connected to the second coolant line between the autonomous driving controller and the second radiator.

3. The heat pump system for the vehicle of claim 1, wherein the air conditioner includes:
 an HVAC module including an evaporator connected thereto through the refrigerant line, and a door that controls a flow of external air passing through the evaporator into the internal condenser according to cooling, heating, and dehumidifying modes of the vehicle;
 a heat-exchanger heat-exchanging the refrigerant supplied through the refrigerant line with external air;
 a compressor connected between the evaporator and the internal condenser through the refrigerant line;
 a first expansion valve provided in the refrigerant line between the heat-exchanger and the evaporator;
 a second expansion valve provided in the refrigerant connection line; and
 an accumulator provided in the refrigerant line between the evaporator and the compressor and connected to the refrigerant connection line.

4. The heat pump system for the vehicle of claim 3, wherein the second expansion valve, when cooling the battery module by using a coolant heat-exchanged with the refrigerant, expands the refrigerant flowing through the refrigerant connection line to flow into the chiller.

5. The heat pump system for the vehicle of claim 3, wherein the gas injection part includes:
 a gas-liquid separator provided in the refrigerant line between the internal condenser and the heat-exchanger, wherein the gas-liquid separator is configured to discharge a gaseous refrigerant and a liquid refrigerant among the refrigerant that has passed through the internal condenser;
 a bypass line connecting the gas-liquid separator and the compressor, the bypass line configured to supply the gaseous refrigerant from the gas-liquid separator to the compressor;
 a bypass valve provided in the bypass line;
 a third expansion valve provided in the refrigerant line between the internal condenser and the gas-liquid separator; and
 a fourth expansion valve provided in the refrigerant line between the gas-liquid separator and the heat-exchanger.

6. The heat pump system for the vehicle of claim 5, wherein when the gas injection part is operated in a heating mode of vehicle, the third expansion valve expands a refrigerant supplied from the internal condenser to supply it to the gas-liquid separator; and the fourth expansion valve expands a refrigerant supplied from the gas-liquid separator to flow to the refrigerant line.

7. The heat pump system for the vehicle of claim 5, wherein when the gas injection part is not operated in a heating mode of the vehicle, the third expansion valve passes a refrigerant supplied from the internal condenser; and the fourth expansion valve expands a refrigerant that has passed through the gas-liquid separator to supply it to the heat-exchanger.

8. The heat pump system for the vehicle of claim 5, wherein in a cooling or dehumidifying mode of the vehicle, the third and fourth expansion valves do not expand the refrigerant supplied from the internal condenser, but flow the refrigerant through the refrigerant line.

9. The heat pump system for the vehicle of claim 5, wherein the bypass valve, when the gas injection part is operated, operates so that the bypass line is opened.

10. The heat pump system for the vehicle of claim 5, wherein the first, second, third, and fourth expansion valves are electronic expansion valves that expand the refrigerant while controlling flowing of the refrigerant.

11. The heat pump system for the vehicle of claim 5, wherein the heat-exchanger condenses or evaporates the refrigerant condensed in the internal condenser through heat-exchange with external air, according to a selective operation of the fourth expansion valve.

12. The heat pump system for the vehicle of claim 5, wherein the air conditioner further includes a refrigerant branch line connecting the refrigerant line between the heat-exchanger and the first expansion valve, through a refrigerant valve provided in the refrigerant line between the heat-exchanger and the gas injection part.

13. The heat pump system for the vehicle of claim 12, wherein the refrigerant valve, when external heat is not recovered in a dehumidifying or heating mode of the vehicle, opens the refrigerant branch line, and closes a part of the refrigerant line connected to the heat-exchanger.

14. The heat pump system for the vehicle of claim 12, wherein when the gas injection part operates while recovering waste heat from the electrical component in a heating mode of the vehicle in a state in which the first coolant line connected to the electrical component is opened by the first valve, and the first coolant line connected to the first radiator is closed, the first branch line is opened;

in the first cooling apparatus, the first coolant that has passed through the electrical component by the first water pump is supplied to the chiller through the opened first branch line without passing through the first radiator;

the second cooling apparatus stops operation;

in the air conditioner, the refrigerant line connected to the evaporator is closed by the first expansion valve;

the refrigerant connection line is opened by the second expansion valve;

the second expansion valve expands a refrigerant supplied to the refrigerant connection line to supply the refrigerant to the chiller;

in the gas injection part, the bypass line is opened by the bypass valve, the third expansion valve expands a refrigerant to supply the refrigerant to the gas-liquid separator, and the fourth expansion valve expands a refrigerant passing through the gas-liquid separator; and the refrigerant valve opens the refrigerant branch line so that the refrigerant expanded while passing through the fourth expansion valve is not supplied to the heat-exchanger.

15. The heat pump system for the vehicle of claim 12, wherein:

in a dehumidifying mode of the vehicle, the first and second cooling apparatuses stop operation;

in the air conditioner, the refrigerant line connected to the evaporator is opened by the first expansion valve;

the refrigerant connection line is closed by the second expansion valve; and the refrigerant valve opens the refrigerant branch line so that the refrigerant supplied from the internal condenser is not supplied to the heat-exchanger.

16. The heat pump system for the vehicle of claim 3, wherein when cooling the battery module and the autonomous driving controller in a cooling mode of the vehicle, the second branch line is opened by the second valve, and the second coolant line connected to the second radiator is closed based on the second branch line;

in the second cooling apparatus, while the second coolant is circulated in the opened second branch line and the opened second coolant line by the second water pump, the second coolant that has passed through the chiller is supplied to the battery module and the autonomous driving controller;

in the air conditioner, the refrigerant is circulated along the refrigerant line and the refrigerant connection line in a state in which the refrigerant connection line is opened by the second expansion valve; and the first and second expansion valves expand the refrigerant so that an expanded refrigerant is supplied to the evaporator and the chiller, respectively.

17. The heat pump system for the vehicle of claim 3, wherein when recovering waste heat from an external heat source, the electrical component, the battery module, and the autonomous driving controller in a heating mode of the vehicle, in a state in which the first coolant line connected to the electrical component is opened by the first valve and the first coolant line connected to the first radiator is closed, the first branch line is opened;

in the first cooling apparatus, the first coolant that has passed through the electrical component by the first water pump is supplied to the chiller through the opened first branch line without passing through the first radiator;

in a state in which the second branch line is opened by the second valve, the second coolant line connected to the second radiator is closed based on the second branch line;

in the second cooling apparatus, the second coolant that has passed the battery module and the autonomous driving controller by the second water pump is supplied to the chiller through the second branch line;

in the air conditioner, a refrigerant line connecting the heat-exchanger and the evaporator is closed by the first expansion valve;

the refrigerant connection line is opened by the second expansion valve; and the second expansion valve expands a refrigerant supplied to the refrigerant connection line to supply the refrigerant to the chiller.

18. The heat pump system for the vehicle of claim 3, wherein the heat-exchanger is an air-cooled heat-exchanger.

19. The heat pump system for the vehicle of claim 1, wherein when cooling the electrical component, the battery module, and the autonomous driving controller,
- the first branch line is closed by the first valve;
- the second branch line is closed by the second valve;
- the first coolant cooled by the first radiator is supplied to the electrical component along the first coolant line by the first water pump; and
- the second coolant cooled by the second radiator is supplied to the battery module and the autonomous driving controller along the second coolant line by the second water pump.

20. The heat pump system for the vehicle of claim 1, wherein the electrical component includes a power control device, an inverter, an on board charger (OBC), or a power converter.

* * * * *